United States Patent

[11] 3,585,796

| [72] | Inventor | Geoffrey Arthur Lewis |
| | | Olton, Solihull, England |
| [21] | Appl. No. | 841,817 |
| [22] | Filed | July 15, 1969 |
| [45] | Patented | June 22, 1971 |
| [73] | Assignee | Joseph Lucas (Industries) Ltd. |
| | | Birmingham, England |

[54] GAS TURBINE CONTROL SYSTEM
21 Claims, 8 Drawing Figs.

[52] U.S. Cl. ................................................. 60/39.16,
60/39.25, 60/39.28
[51] Int. Cl. ................................................. F02c 9/02,
F02g 3/12, F02c 3/10
[50] Field of Search........................................... 60/39.16,
39.25, 39.28

[56] References Cited
UNITED STATES PATENTS

| 2,912,824 | 11/1959 | Van Nest et al. | 60/39.25 X |
| 3,044,262 | 7/1962 | Chadwick et al. | 60/39.16 |
| 3,181,295 | 5/1965 | Pauwels et al. | 60/39.16 |
| 3,211,424 | 10/1965 | Lewakowski | 60/39.16 X |
| 3,300,966 | 1/1967 | Chadwick | 60/39.16 |
| 3,357,178 | 12/1967 | Meyers | 60/39.25 |
| 3,362,156 | 1/1968 | McLean | 60/39.16 X |
| 3,487,482 | 1/1970 | Maljanian | 60/39.25 X |
| 3,521,446 | 7/1970 | Maljanian | 60/39.16 |

*Primary Examiner*—Al Lawrence Smith
*Attorney*—Holman & Stern

ABSTRACT: In a control system for a gas turbine control system which has mechanically adjustable work turbine stator vanes, there is a throttle-actuated servo device which produces a mechanical output and an hydraulic pressure signal. The device includes a flow restrictor which slows down the device during acceleration so that the pressure signal falls for a period during which a vane-adjusting servo device opens the stator vanes in response to a change in the hydraulic pressure signal. This period lasts until the throttle servo is restored to equilibrium.

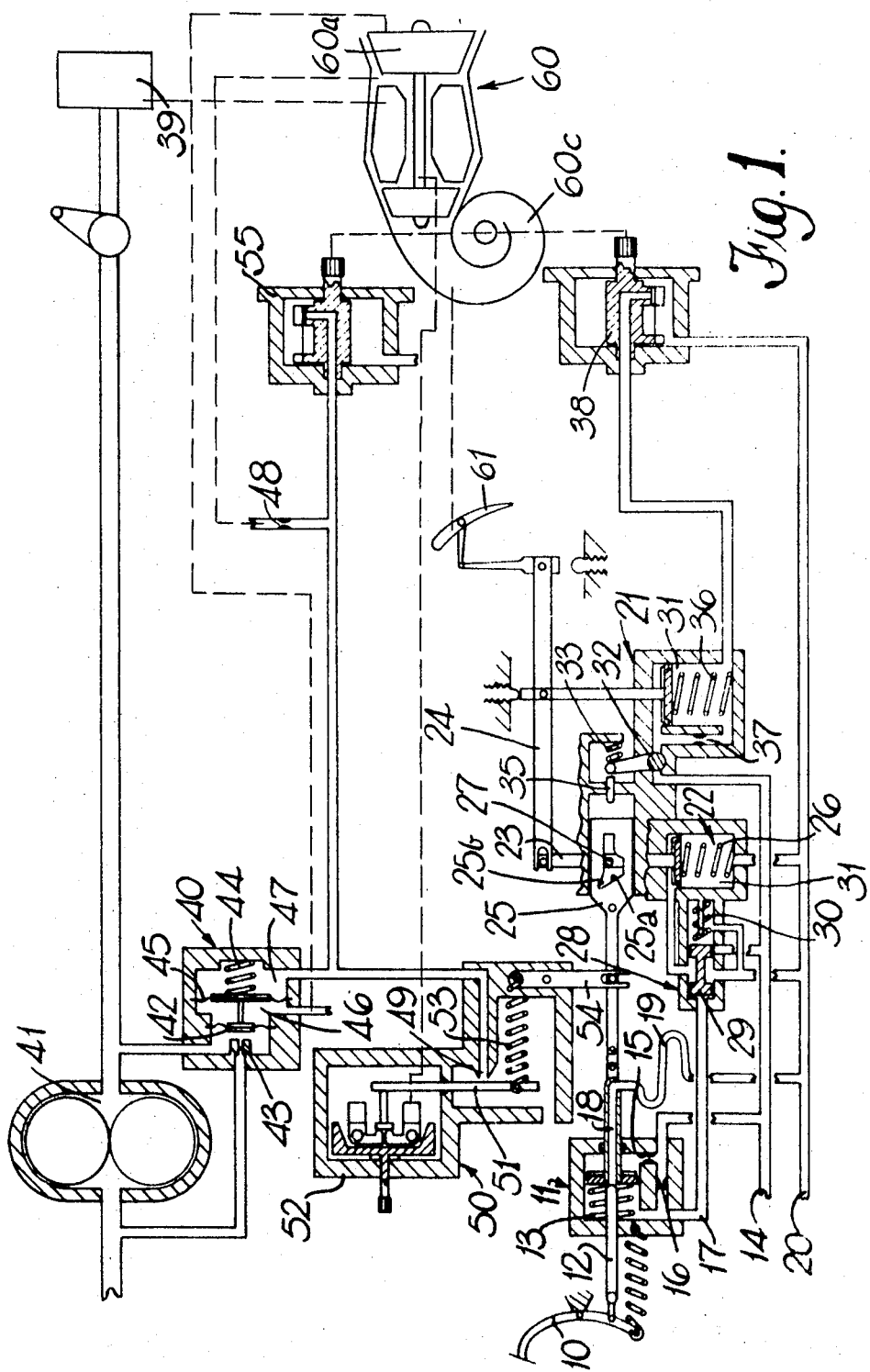

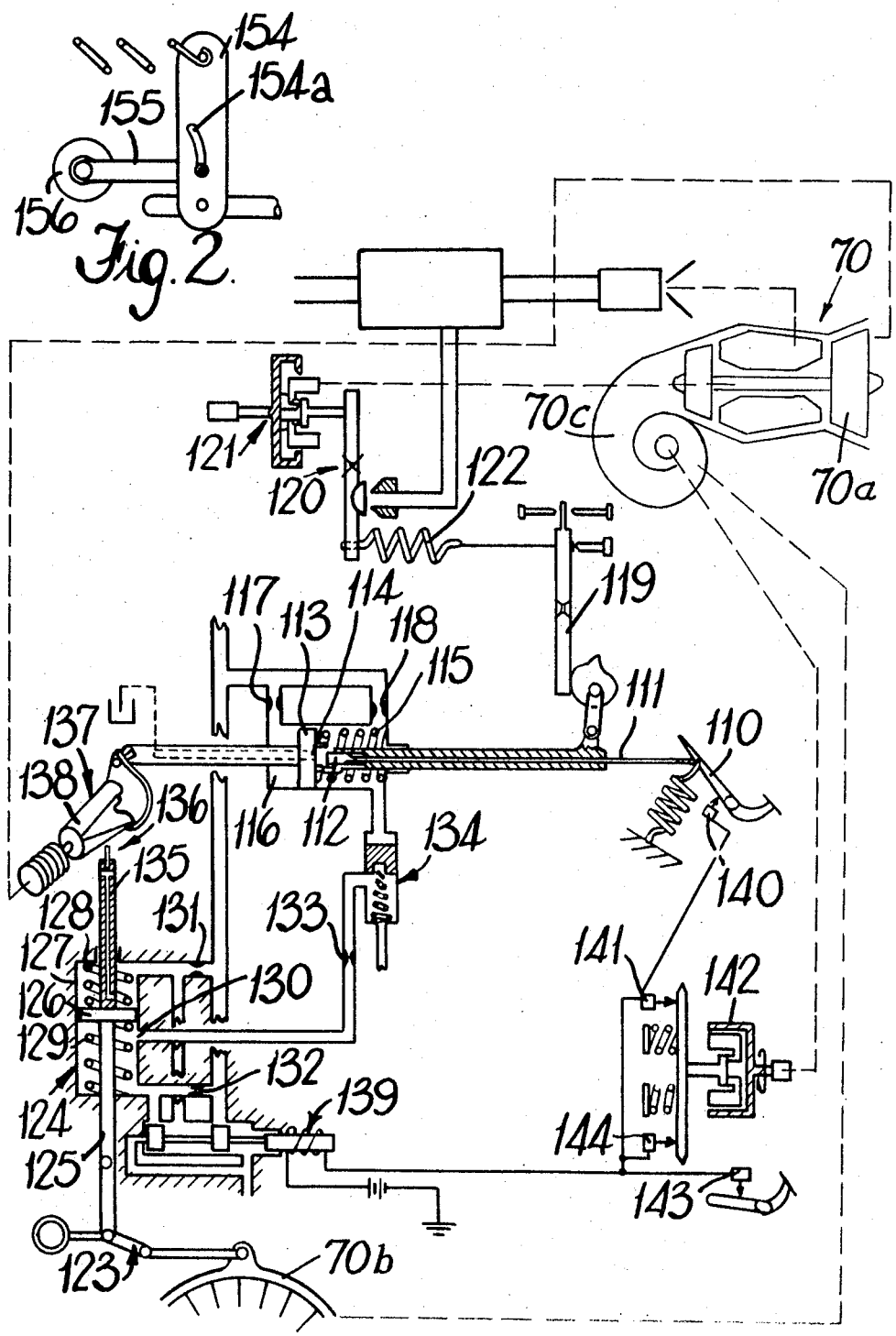

GAS TURBINE CONTROL SYSTEM

This invention relates to a control system for a gas turbine having mechanically adjustable work turbine stator vanes whereby the distribution of power between the compressor turbine and the work turbine can be varied. With such an engine it is desirable to keep the steady state combustion chamber temperature at value throughout the entire range of running speeds. Thus the usual method of accelerating, i.e., merely overfueling, cannot be employed since the combustion chamber temperature cannot be raised higher than its existing maximum value.

The present invention sets out to provide a control system which, for acceleration, first causes the vanes to be adjusted to create an acceleration margin, then increases the fuel input until the required speed is reached and then causes the vanes to be readjusted to give the required temperature conditions for the new speed.

A control system in accordance with the invention comprises a throttle servo device which, in use, produces first and second output signals in response to an input signal such that there is a predetermined value of the first output signal corresponding to each steady state value of the input signal, but the first output signal lags behind the input signal, and the second output signal is changed substantially immediately when the input signal is changed to demand an increased engine speed, the change in the second output signal being cancelled when the first output signal attains its predetermined value corresponding to the changed value of the input signal, a fuel control servo device for controlling the flow of fuel to the engine in response to said first output signal, and a vane-adjusting servo device for adjusting the adjustable work turbine stator vanes and arranged so that the vanes can be situated in two alternative positions for each value of the first output signal, and occupy the one of these positions in which there is an acceleration margin for the duration of the aforementioned change in the second output signal.

It is to be understood that the aforementioned input signal and the first and second input signals may take a variety of forms as mechanical movements, electrical voltage or current signals or hydraulic or pneumatic pressure signals. In the specific described below the input signal and the first output signal are mechanical movements. The throttle servo device is hydraulically operated and includes a dashpot arrangement whereby the lag is introduced. The second output signal is an hydraulic pressure signal.

In the accompanying drawings:

FIG. 1 is a diagrammatic representation of one example of a gas turbine control system in accordance with the invention;

FIG. 2 is a fragmentary diagram showing a modification of FIG. 1;

FIG. 3 is a diagrammatic representation of another example of the invention;

Figure 4:
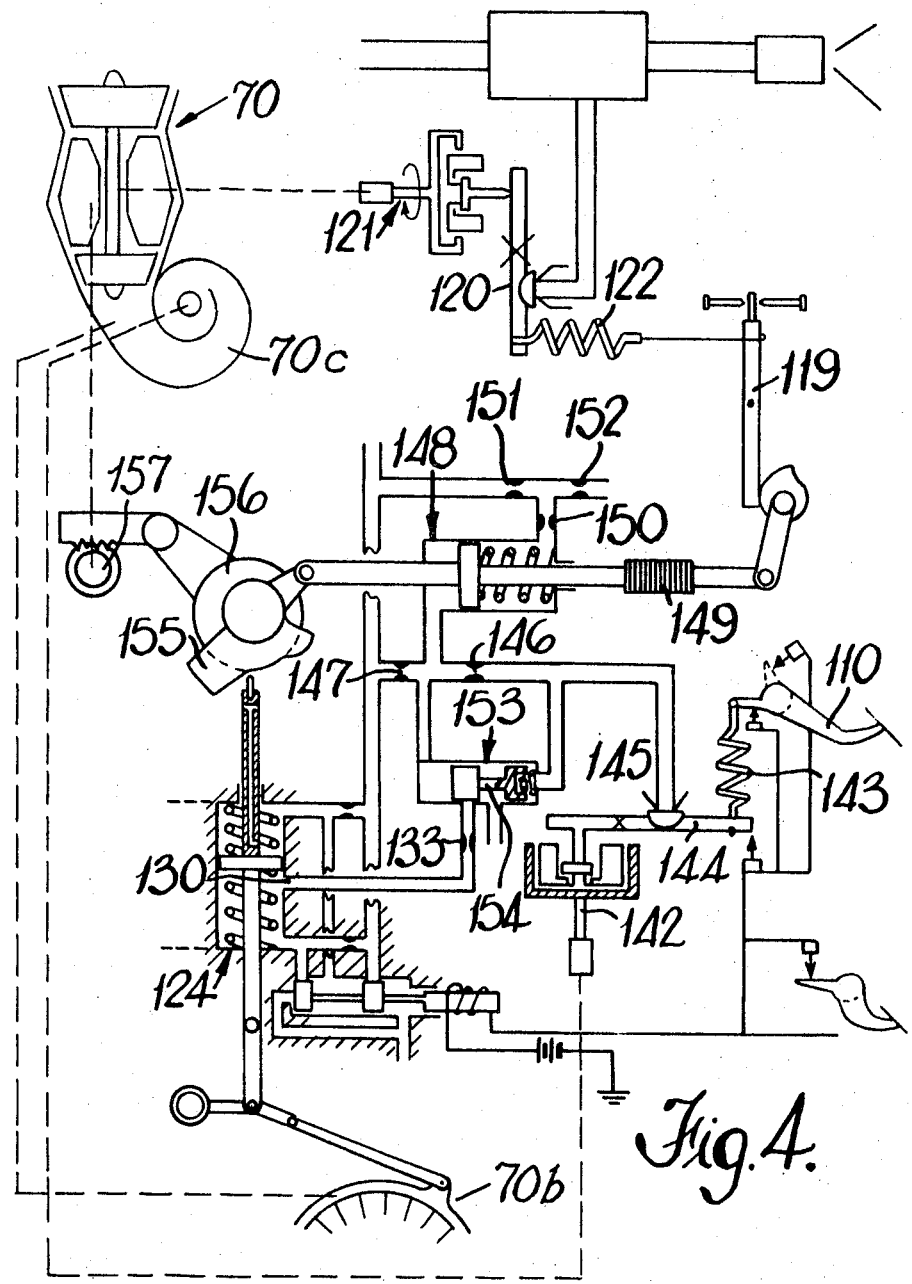
FIG. 4 is a diagrammatic representation of yet another example of the invention.

The system shown in FIG. 1 is intended for use with a road vehicle gas turbine engine.

The basic parameters of the control system are (A) the speed of the engine 60, (B) the pressure at the intake of the compressor 60a of the engine, (C) the delivery pressure of the compressor, and (D) the position of a throttle control foot pedal.

The foot pedal 10 is associated with a throttle servo device 11, the pedal 10 causing mechanical input movement of a member 12 of this servo device. The servo device consists basically of an hydraulic piston and cylinder unit. The input member 12 acts as a valve control member which coacts with a seat defined by the end of the piston rod of the device, said piston rod being tubular. The piston is urged by a spring 13 in a direction such that it tends to move away from the control member 12. Pressurized liquid is supplied to one end of the cylinder from a pressure line 14 via a restrictor 15 and to the other end thereof via a restrictor 16. Said other end of the cylinder has an outlet 17 and the passage 18 which extends through the piston rod is connected via a flexible connector 19 to a drain line 20.

Thus, in use in equilibrium, there will be a continuous flow of liquid through the restrictor 16 to said other end of the cylinder and from said other end of the cylinder through the passage 18 in the piston rod. The pressure in said other end of the cylinder will depend upon the proximity of the control member 12 to the piston and for any given position of the control member 12 there will be a corresponding predetermined position for the piston such that the pressure in said other end of the cylinder is sufficient to balance the pressure applied in said one end of the cylinder (taking into account the effect of the spring 13). When the foot pedal 10 is depressed the control member 12 will be moved away from the piston so that there will be an immediate drop in pressure in said other end of the cylinder. This will result in the piston moving towards the control member 12 until the piston reaches a new predetermined position in which equilibrium is restored. The restrictor 15 introduces a lag into the movement of the piston relative to the control member. Thus, during movement of the piston there will be a pressure in the outlet 17, but the pressure will rise again when the piston reaches its new position.

When the control member 12 is caused to approach the piston there will, similarly, be a rise in the pressure in said other end of the cylinder so that the piston will move away from the control member 12.

For controlling the positions of the adjustable stator vanes 61 of the work turbine 60c, there is provided a vane-adjusting servo device 21. This mechanism includes an hydraulic piston and cylinder unit 22 the piston rod 23, of which, is coupled to a lever 24 which operates the vane-adjusting mechanism (not shown in detail). Movement of the piston rod 23 is limited by a cam 25 coupled to the piston rod of the throttle servo device 11. This cam has a steady running profile 25a and an acceleration profile 25b. The piston of the piston and cylinder unit 22 is urged by a spring 26 therein so that the cam follower 27 thereon is urged into engagement with the acceleration profile 25b. The chamber within the piston and cylinder unit 22 on the side of the piston thereof to which pressure would have to be applied to urge the piston the piston the same direction as the spring 26 is connected to the drain line 20. For controlling the application of pressure to the opposite side of the piston there is a pilot valve 28. The spool 29 of this valve is spring loaded by means of a spring 30 to a position such that the chamber of said other side of the piston of the unit 22 is connected to the drain line 20. The spool 29 is, however, movable against its spring loading by pressure applied thereto from the outlet 17 of the throttle servo device. During normal steady running of the engine the spool 29 is held by this pressure against a stop 31 within the pilot valve 28 so that the connection of the chamber into the other side of the piston is connected not to the drain line 20 but the pressure line 14. When the pilot valve is in this condition the piston of the unit 22 is moved against the spring loading so that the cam follower 27 engages the steady running cam profile 25a.

The vane-adjusting servo device shown also includes a piston and cylinder unit 31 for moving the pivot axis of the lever 24 to obtain an independent adjustment of the vane positions in accordance with the speed of rotation of a power shaft driven by the engine, to enable engine braking to be effected. The supply of hydraulic liquid to this unit 31 is controlled by a valve 32 which is kept in a partially closed condition during normal running of the engine by a spring 33 this valve is opened by engagement of a stem 34 by the cam 35 when the foot pedal is released. The piston of the unit 31 is urged by a spring 36 to a limiting position such that for any given position of the piston rod 23 the vanes will be deflected as far as possible from their fully open positions. Movement of the piston of the unit 31 against its spring loading can move the vanes to their fully open positions or beyond to reverse flow positions. A chamber in the unit 31 on the side of the piston to which pressure must be applied to move the vanes towards their open position is connected directly to the outlet side of the valve 32. The chamber on the other side of the piston is connected to the outlet side of the valve 32 via a restrictor 37 and is also connected to a speed-sensitive valve 38 which starts to open at a predetermined speed of the power shaft driven by the work turbine. When the valve 38 is closed equal pressures will be applied to opposite sides of the piston of the unit 31 and the piston will therefore be held in its limiting position by the spring 36. When the valve 38 starts to open however there will be a flow of liquid through the restrictor 37 thereby establishing a pressure difference across the two sides of the piston of the unit 31. The piston is moved when this pressure difference is sufficient to overcome the spring loading of the piston. It will be appreciated that the valve 32, when partially closed as shown, will act to restrict flow through the restrictor 37 so that the power shaft speed at which the pressure drop becomes sufficient to move the piston will be higher during normal running than during idling.

The control of the supply of fuel to the burners 39 of the engine is effected by means of a fuel pressure control valve 40 which controls the spilling of fuel from the outlet side of a pump 41. Such control is effected by means of a valve member 42 coacting with a nozzle 43. The valve member 42 is urged by means of a spring 44 towards the nozzle 43 a diaphragm 45 connected to the valve member 42 divides a chamber 46 connected to a tapping from the compressor intake, from a chamber 47 connected via a restrictor 48 to a tapping on the delivery side of the compressor.

The restrictor 48 forms part of an air potentiometer the other part of which is defined by a nozzle 49 in a fuel control servo device 50. Flow of air from the nozzle 49 is controlled by a pivoted member 51 which is acted upon at one end by a governor 52 driven by the engine. The member 51 is acted upon at the other end by a spring 53 connected by a pivoted link 54 to the piston rod of the throttle servo device 11. Nozzle 49 is opened by a increase of the speed of the engine or by a decrease in the force applied to the member 51 by a spring 53 caused by a movement of the piston rod of the device 11 when the foot pedal 10 is allowed to rise.

During normal steady running, the throttle servo device 11 and the fuel control servo device are both in equilibrium so that the quantity of fuel supplied to the burners 39 is just sufficient to maintain a required speed dependent on the position of the foot pedal 10. The position of the vanes is determined by the position of the pedal 10, the cam follower 27 on the piston rod 23 being engaged with the cam profile 25a to determine the correct vane setting for that particular engine speed.

On depression of the pedal 10 to demand a higher speed, the pressure 17 immediately falls from the previously existing value so that the spool 29 is moved by its spring loading to the position shown. The spring 26 then causes the vanes to be opened. Meanwhile the piston rod of the device 11 moves to the left as viewed in the drawing so that an increasing force is applied by the spring 53 to the member 51 thereby partially closing the nozzle 49. A pressure rise in the chamber 47 causes the amount of fuel spilled from the outlet of the pump 41 to be reduced so that additional fuel is supplied to the burners 39 the speed of the engine therefore increases. When the piston of the servo device 11 reaches its new equilibrium position the pressure at outlet 17 will rise again so that the valve spool 29 is moved back against its spring loading to admit pressure to the unit 21 to reclose the vanes to the new position determined by the cam profile 25a.

The example shown also includes a power shaft overspeed governor 55 in the form of a speed-sensitive valve similar to the speed-sensitive valve 38. This governor 55 spills air from the downstream side of the restrictor 48 so as to reduce the pressure applied to the chamber 47 when the power shaft speed is in excess of a predetermined value.

The modification shown in FIG. 2 shows the provision of a variable pivot point for the lever 154 corresponding to the lever 54 of FIG. 1. The link 154 has an arcuate slot 154a in which runs a pivot pin on the end of an arm 155 angularly movable by a temperature-sensing device 156. This device may be sensitive to the compressor inlet temperature or to the combustion temperature.

As an alternative arrangement for providing a trim in response to the compressor inlet temperature, the cam profiles 25a, 25b may be external three dimensional profiles on a cylindrical body movable axially like the cam 25 but also rotatable by a temperature-sensing device. There would then be two spaced followers on the rod 23 instead of the single follower 27.

Referring now to FIG. 3 the accelerator pedal 110 operates a rod 111 having a valve control element 112 on its end. The valve 112 is a servo control valve for controlling the pressure applied to throttle servo piston 113. Such piston 113 has a valve seat 114 with which the valve member 112 coacts, the piston 113 being spring loaded by a spring 115 out of engagement with the valve member 112. The ends of a cylinder 116 in which the piston 113 is slidable are connected via a pair of restrictors 117, 118 respectively to a source of pressurized servo fluid. The valve constituted by the valve member 112 and the seat 114 controls the leakage from the end of the cylinder 116 associated with the restrictor 118, to drain. Pressure in this last mentioned end of the cylinder urges the piston in the same direction as the spring 115. The piston 113 has a piston rod which is coupled in any convenient manner, for example, by a link and a rotary cam as shown, to a lever 119 forming a mechanical input to a valve device 120 which also receives a mechanical input from a governor 121 driven by the compressor 70a of the engine 70. The valve 120 is balanced when the force applied to it by the lever 119 through a spring 122 is balanced by the force applied by the governor 121, so that the valve 120 is in equilibrium for each position of the servo piston 113 when the compressor is running at a predetermined speed corresponding to that position of the piston 113.

For controlling the adjustable stator vanes 70b of the work turbine 70c there is a mechanism 123 which will not be described in detail herein. This mechanism is actuated by a vane-adjusting servomechanism 124 with a piston rod 125 serving as its output member. The piston rod 125 is connected to a piston 126 sliding in a cylinder 127, the piston 126 being urged by springs 128, 129 to a midposition in which it overlies a central port 130 in the cylinder 127. The ends of the cylinder 127 are connected via restrictors 131, 132 respectively to the supply of pressurized servo fluid. The port 130 is connected via a restrictor 133 to a valve 134 which is connected to the end of the cylinder 116 having the restrictor 118 and is arranged to cause the pressure in said ends of the cylinder 116 to be applied at the port 130 when the throttle servo is in equilibrium. When the pressure in said end of the cylinder 116 falls, during acceleration, the valve 134 occupied the condition shown in which fluid can flow from the port 130 via the restrictor 133 and the valve 134 to drain. The piston 126 also has a piston rod portion 135 which is formed with a passage communicating with the end of the cylinder 127 having the restrictor 131. The end of the rod portion 135 has a followup servo valve 136 controlling the escape of fluid from the passage in the rod portion 135 to drain. This followup servo valve 136 coacts with a three-dimensional cam 137 coupled to the piston 113 of the throttle servo device for rotation and actuated by a temperature-sensitive device 138 to cause axial movement of the cam 137 in accordance with the temperature at the compressor intake.

Thus, when the piston 113 is in equilibrium and the pressure in the end of the cylinder 116 having the restrictor 118 is therefore elevated, the valve 134 will serve to connect the port 130 to this end of the cylinder 116 so that there will be a net upward force on the piston 126 (as viewed in FIG. 3). Upward movement of the piston 126 will therefore continue until the followup servo valve 136 engages the three-dimensional cam 137, the position of which will be dependent upon the prevailing temperature at the compressor intake and the position of the piston 113. The vanes of the work turbine stator will therefore be set at positions determined by these two variables. During acceleration, as mentioned above, the pressure in the end of the cylinder 116 having the restrictor 118 falls so that valve 134 connects port 130 to drain. As a result the piston 126 will move to a predetermined midposition thereby opening the work turbine vanes and preparing the engine for overfuelling for acceleration. This change in the vane positions take place more quickly than the change in the position of the piston 113 which actuates the fuel control to increase the fuel flow to the combustion chamber. When the required speed has been reached, the pressure in the end of the cylinder 116 having the restrictor 118 will rise again so that the piston 126 will again be moved upwards to a new position corresponding to the altered position of the cam 137.

For engine braking the vanes of the work turbine stator are moved to reverse positions utilizing the servo device 124. For this purpose there is provided a solenoid valve 139 which, on energization, connects the lower end of the cylinder 127 directly to drain and the upper end of the cylinder 127 directly to the supply of pressurized servo fluid. The piston 126 is therefore moved downwards beyond its central position. The solenoid valve 139 is energized under several conditions. Firstly it may be energized for deliberate engine braking when the accelerator pedal 110 is released whilst the vehicle is in motion. This is effected by means of a switch 140 which closes when the accelerator pedal is released and a switch 141 which is actuated by a governor 142 driven by the work turbine and arranged to open when the work turbine is at rest. A switch 143 on the clutch pedal of the vehicle in which the engine is used may be employed to energize the solenoid valve 139 to reverse the vanes during gear changing. Finally a thermoswitch 144 operated by the work turbine governor 142 may be arranged to energize the solenoid valve 139 when the work turbine exceeds a predetermined speed.

Turning now to FIG. 4 it will be seen that the throttle servo device has been divided into two parts. The accelerator pedal 110 now operates a spring 143 acting on a beam 144, also acted upon by the work turbine governor 142. The beam 144 has a valve element 145 connected via restrictors 146, 147 in series to the supply of pressurized servo fluid. This valve 145 controls a sec the throttle servo constituted by a piston and cylinder unit 148 which replaces the piston and cylinder unit 113, 116 of the system described in FIG. 3. The servo device 148 is coupled, as before, to a lever 119, and this coupling may include a variable length link 149 sensitive to the compressor intake temperature. The piston of the servo device 148 is spring loaded to urge it in a direction to decrease the supply of fuel to the engine. The end of the cylinder of the servo device 148 to which pressure is applied to assist the spring loading of the piston thereof is connected via restrictors 150, 151 in series to the supply of pressurized servo fluid, a drain connection via a further restrictor 152 being taken from the interconnection of these two restrictors 150, 151. The other end of the cylinder is connected between the restrictors 146, 147.

Thus, when servomechanism is in the governor 142 will hold the beam 144 in such a position that the pressure between the restrictors 146 and 147 will exceed the pressure opposite ends of which the restrictors 151 and 152 to a sufficient extent to balance the force applied to the piston by the spring. During acceleration the valve 145 spring. During be closed so that the pressure between the restrictors 146, 147 will rise and the piston will therefore move to the right as viewed in FIG. 4 at a speed determined by the restrictor 115.

The vane-adjusting servomechanism 124 is the same as that shown in FIG. 3 but the valve 134 is replaced by a valve 153 which has a spool 154 on opposite ends of which the pressures respectively on opposite sides of the restrictor 146 act. When the system is in equilibrium during steady running of the engine the pressure drop across the restrictor 146 is such that the spool 154 is held in the position shown, preventing flow of fluid from the port 130 of a fuel pressure control valve servo device 124. During acceleration the flow through restrictor 146 is reduced so that the pressure drop across this restrictor is reduced and the spool 154 then moves to the left as seen in FIG. 4 connecting the port 130 to drain via the restrictor 133.

In the example shown in FIG 4 the three-dimensional cam of FIG. 3 has been replaced by a cam 155 rotatable by the servo device 148 relative to a carrier 156 which is itself rotatable on an axis spaced from the axis of the cam 155. A temperature-sensitive rotary actuator 157 is arranged to turn the carrier 156 to apply a trim to the vane control in accordance with the combustion existing.

FIGS. 5 to 8 show, in more detail, the various fuel controls which may be employed in either of the systems described above. The arrangement shown in FIG. 5 incorporates control a fuel pressure control 160 which controls the spilling of fuel from the outlet side of a gear pump 161. Such control is effected by means of a valve member 162 coacting with a nozzle 163. The valve member 162 is urged towards the nozzle 163 by means of a spring 164. A diaphragm 165 connected to the valve member 162 divides a chamber 166, connected to a tapping from the compressor intake, from a chamber 167 connected via a restrictor 168 to a tapping on the delivery side of the compressor. A further diaphragm 169 senses the fuel pressure which tends to urge the valve member 162 against its spring loading. The valve 120 of FIG. 3 forms, in combination with the restrictor 168 an air potentiometer whereby the air pressure applied to the chamber 167 is a function of the compressor delivery pressure, the position of the piston 113 and the speed of the compressor.

Figure 5:
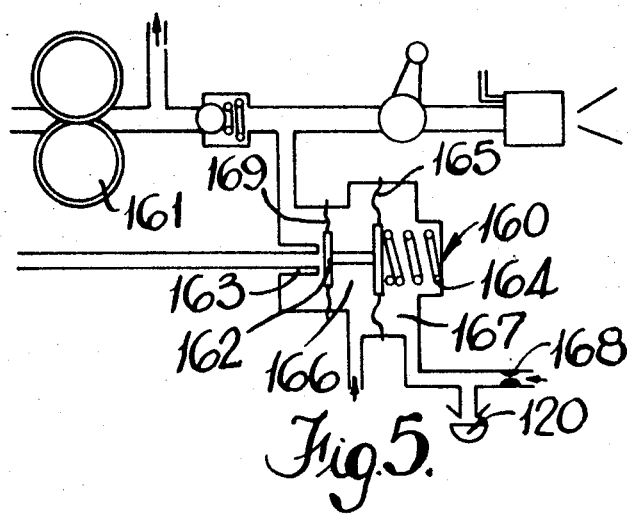
FIGS. 5 to 8 are diagrammatic representations of fuel flow which can be used in the examples shown in FIGS. 3 and 4.
Figure 6:
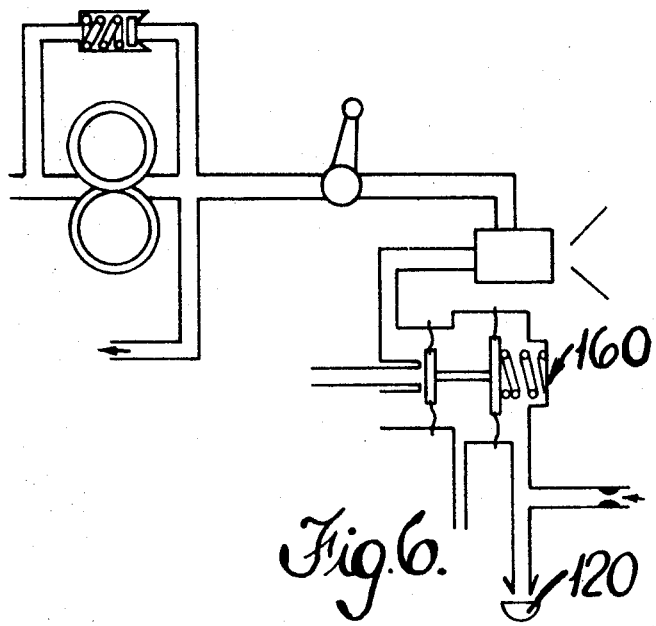

In the system shown in FIG. 6 a spill sprayer is used instead of the air-pressure-type fuel sprayer used in FIG. 5. A control valve 160 substantially identical to that described in respective FIG. 5 is used to control the spillage of fuel from the sprayer.

Figure 7:
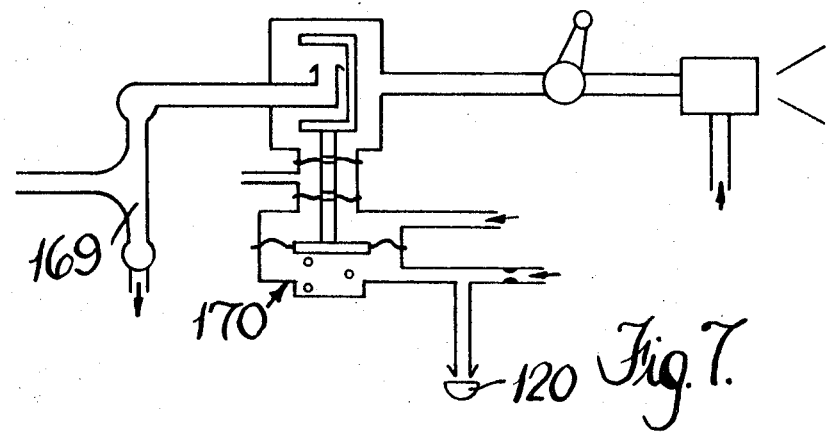

In FIG. 7 a centrifugal pump 169 is used instead of the gear pump 161. Instead of the valve 160 controlling spilling of excess fuel from the pump a slightly different valve 170 is used to restrict flow from the pump to obtain the required pressure in accordance with the same parameters as before.

Figure 8:
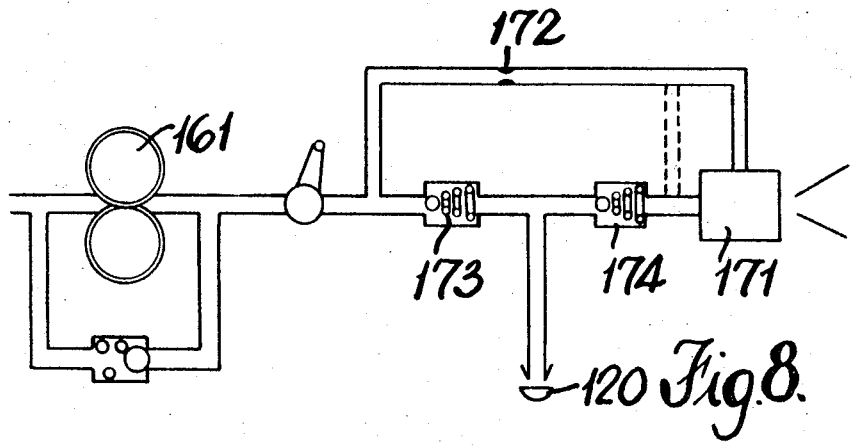

Finally, FIG. 8 shows an arrangement utilizing a Duplex sprayer 171 in combination with a gear pump 161. The primary flow to the sprayer passes through a restrictor 172 whereas the secondary flow, which is passed by a pressurizing valve 173 and a second pressurizing valve 174 in series. Excess fuel is spilled from between the valves 173 and 174 by the valve 120.

In the fuel controls of FIGS. 5, 6, and 7 the pump output can be used for the servo operation. In the case of FIG. 8, however, it is necessary to employ a separate pump to supply the servo fluid.

Having thus described my invention what I claim as new and desire to secure by Letters Patent is:

1. A control system for a gas turbine engine having a combustion chamber, a compressor, a work turbine and mechanically adjustable work turbine stator vanes, comprising a throttle servo device which, in use, produces first and second output signals in response to an input signal such that there is a predetermined value of the first output signal corresponding to each steady state value of the input signal, but the first output signal lags behind the input signal, and the second output signal is changed substantially immediately when the input signal is changed to demand an increased engine speed, the change in the second output signal being cancelled when the first output signal attains its predetermined value corresponding to the changed value of the input signal, a fuel control servo device for controlling the flow of fuel to the engine in response to said first output signal, and a vane-adjusting servo device for adjusting the adjustable work turbine stator vanes and arranged so that the vanes can be situated in two alternative positions for each value of the first output signal, and occupy the one of these positions in which there is an acceleration margin for the duration of the aforementioned change in the second output signal.

2. A control system as claimed in claim 1 in which the first output signal of the throttle servo device is a mechanical movement and the second output signal is an hydraulic pressure signal.

3. A control system as claimed in claim 2 in which the throttle servo device comprises a piston and cylinder unit, a throttle-actuable valve for controlling the flow of liquid from one end of the cylinder, the other end of the cylinder being connected via a flow restrictor to a supply of pressurized fluid, said second output signal being the hydraulic pressure within said one end of the cylinder.

4. A control system as claimed in claim 3 in which the throttle actuable valve includes coacting parts movable by the throttle control and the piston of the piston and cylinder unit respectively.

5. A control system as claimed in claim 3 in which the vane-adjusting servo device includes a pilot valve connected to said one end of the piston and cylinder unit and controlling the supply of pressurized liquid to a piston and cylinder unit of the vane-adjusting servo device.

6. A control system as claimed in claim 5 in which the vane-adjusting servo device includes a cam which is coupled to the mechanical output of the throttle servo mechanism for movement thereby, and which is engageable by a cam follower movable by the piston and cylinder unit of the vane-adjusting servo device.

7. A control system as claimed in claim 6 in which said cam has two profiles respectively defining the two alternative positions of the vanes.

8. A control system as claimed in claim 7 in which the vane-adjusting servo device includes a further piston and cylinder unit for independently adjusting the vane orientation.

9. A control system as claimed in claim 8 in which said further piston and cylinder unit of the vane-adjusting servo device is connected to a lever which is movable by said first mentioned piston and cylinder unit of the vane-adjusting servo device, said further piston and cylinder unit serving to displace the lever axis transversely to the length of the lever.

10. A control system as claimed in claim 9 in which said further piston and cylinder unit is adapted to displace the vanes to a reverse flow position.

11. A control system as claimed in claim 6 in which the piston and cylinder unit of the vane-adjusting servo device has connection at both ends which are connected via flow restrictors to a supply of pressure fluid and the cam follower controls a valve for controlling the escape of fluid from one end of the unit.

12. A control system as claimed in claim 11 in which the vane-adjusting servo device piston and cylinder unit has a center tapping which is normally connected by said pilot valve to a supply of pressurized fluid, but which is connected to drain when said pilot valve is actuated, to cause the piston of the vane-adjusting servo device piston and cylinder unit to take up a central position in which the vanes are fully opened.

13. A control system as claimed in claim 12 including an additional valve which, on actuation connects said one end of the vane-adjusting servo device piston and cylinder unit to a pressure fluid supply and connects the opposite end to drain so as to cause the piston to move beyond the central position to a vane, reversed position.

14. A control system as claimed in claim 1 in which the throttle servo device comprises two servo stages, the first of which receives an input signal in accordance with the desired speed of the work turbine and the actual speed of the work turbine and which produces said second output signal the other stage receiving said second output signal and producing said first output signal.

15. A control system as claimed in claim 14 in which said first servo stage comprises a valve, spring means coupled to an accelerator pedal for urging said valve closed, and a mechanical governor which applies to said valve an opening load which increases with the rotary speed of the work turbine.

16. A control system as claimed in claim 15 in which said second servo stage comprises a piston and cylinder unit having one end connected via a first flow restrictor to a pressure supply and by a second flow restrictor to said first servo stage valve, and having its other end connected to the pressure supply by two flow restrictors in series, a further flow restrictor connecting the interconnection of said two series connected flow restrictors to drain.

17. A control system as claimed in claim 16 incorporating a pilot valve for controlling operation of the vane-adjusting servo device said pilot valve having a closure member sensitive to the pressure drop across said second flow restrictor.

18. A control system as claimed in claim 17 in which the vane-adjusting servo device comprises a piston and cylinder unit with both ends connected via flow restrictors to a supply of pressure fluid, a servo valve controlling flow of fluid from one end of the unit, a cam follower operating said servo valve and a cam movable by the throttle servo device against which the cam follower is normally urged into engagement, the vane-adjusting servo device piston and cylinder unit having a central port normally closed by said pilot valve but opened to drain on actuation of said pilot valve.

19. A control system as claimed in claim 18 in which said cam is angularly movable by the throttle servo device and is eccentrically mounted on a carrier which is angularly movable by a device sensitive to the combustion chamber temperature of the engine.

20. A control system as claimed in claim 19 in which there is a linkage between the throttle servo device and the fuel control servo device, said linkage including a variable length link sensitive to the temperature at the intake of the compressor of the engine.

21. A control system as claimed in claim 1 in which the fuel flow control servo device includes a pilot valve which is urged closed by a spring the loading of which is varied by the throttle servo device, and a governor driven at a speed proportional to the engine compressor speed and arranged to urge the pilot valve open with a force which increases with such speed.